United States Patent [19]

Van Havenbergh et al.

[11] Patent Number: 5,466,541

[45] Date of Patent: * Nov. 14, 1995

[54] LUMINESCENT RADIOGRAPHIC SYSTEM COMPRISING A SUPPORT, A PHOSPHOR-BINDER LAYER AND A PRIMER LAYER THEREBETWEEN

[75] Inventors: Jan E. Van Havenbergh, Zwijndrecht; Jozef R. Aertbelien, Schilde; Philip Dooms, Edegem, all of Belgium

[73] Assignee: AGFA-Gevaert. N.V., Mortsel, Belgium

[ * ] Notice: The portion of the term of this patent subsequent to Aug. 23, 2011, has been disclaimed.

[21] Appl. No.: 892,921

[22] Filed: Jun. 3, 1992

[30] Foreign Application Priority Data

Jul. 12, 1991 [EP] European Pat. Off. ............. 91201827

[51] Int. Cl.$^6$ ............................. G01J 1/58; B32B 31/00
[52] U.S. Cl. .................. 428/690; 428/483; 250/483.1; 250/488.1; 250/484.2; 430/536; 430/534; 430/139; 430/537
[58] Field of Search ................... 428/690, 917, 428/483, 217; 250/483.1, 484.1, 488.1, 327.2; 430/536, 534, 139, 537; 313/506, 511, 512

[56] References Cited

U.S. PATENT DOCUMENTS

| | | | |
|---|---|---|---|
| 4,292,107 | 9/1981 | Tanaka et al. | 156/249 |
| 4,379,039 | 4/1983 | Fujimoto et al. | 204/159.15 |
| 4,571,379 | 2/1986 | Yamazaki et al. | 430/534 |

FOREIGN PATENT DOCUMENTS 3048823  9/1981  Germany .

*Primary Examiner*—Charles R. Nold
*Attorney, Agent, or Firm*—Breiner & Breiner

[57] ABSTRACT

A coating composition suitable for forming an adhesive primer layer on a hydrophobic polyester resin support, wherein said coating composition essentially consists of (an) addition polymerizable monomer or mixture of such monomers having dissolved therein at least one of the polymers (i) and/or (ii), wherein:

(i) is a linear copolyester of isophthalic acid and at least one other dibasic carboxylic acid with an aliphatic diol, said copolyester being soluble in methyl methacrylate for at least 10 g per 100 ml at 20° C., and/or (ii) is a linear polyester of terephthalic acid and/or isophthalic acid with an oxyalkylated bisphenol, said polyester being soluble in methyl methacrylate for at least 10 g per 100 ml at 20° C., and wherein said composition comprises said monomer(s) acting as solvent(s) for polymers (i) and/or (ii) in a 20 to 70% by weight ratio with respect to the totality of said polymer(s) and monomer(s).

12 Claims, No Drawings

LUMINESCENT RADIOGRAPHIC SYSTEM COMPRISING A SUPPORT, A PHOSPHOR-BINDER LAYER AND A PRIMER LAYER THEREBETWEEN

DESCRIPTION

1. Field of the Invention

The present invention relates to primer coating compositions and their use in the production of a luminescent article comprising a phosphor suitable for use in radiography.

2. Background of the Invention

In radiography the interior of objects is reproduced by means of penetrating radiation which is high energy radiation belonging to the class of X-rays, Gamma rays and high energy elementary particle radiation, e.g. Beta-rays, electron beam or neutron radiation. For the conversion of penetrating radiation into visible light and/or ultraviolet radiation luminescent substances, called phosphors, are used.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation whereto a photographic film is more sensitive than to the direct impact of the X-rays.

In practice the light emitted imagewise by said screen irradiates a contacting photographic silver halide emulsion layer film which after exposure is developed to form therein a silver image in conformity with the X-ray image.

For use in common medical radiography the X-ray film comprises a transparent film support double-side coated with a silver halide emulsion layer. During the X-ray irradiation said film is arranged in a cassette between two X-ray conversion screens each of them making contact with their corresponding silver halide emulsion layer.

Single side coated silver halide emulsion films are combined in contact with only one screen to improve image definition which is of great importance e.g. in mammography and in particular fields of non-destructive testing (NDT) known as industrial radiography. Single side coated silver halide emulsion films in combination with only one screen are further used in autoradiography. An autoradiograph is a photographic record formed through the intermediary of penetrating radiation emitted by radioactive material contained in an object, e.g. a microtome cut for biochemical research.

Phosphors suited for use in the conventional radiographic system must have a high prompt emission on X-ray irradiation and low after-glow in favour of image-sharpness.

More recently an X-ray recording system has been developed wherein photostimulable storage phosphors are used having in addition to their immediate light emission (prompt emission) on X-ray irradiation the property to store temporarily a large part of the energy of the X-ray image which energy is set free by photostimulation in the form of light different in wavelength characteristic from the light used in the photostimulation. In said X-ray recording system the light emitted on photostimulation is detected photo-electronically and transformed into sequential electrical signals.

The basic constituents of such X-ray imaging system operating with storage phosphors are an imaging sensor containing said phosphor, normally a plate or panel, which temporarily stores the X-ray energy pattern, a scanning laser beam for photostimulation, a photo-electronic light detector providing analog signals that are converted subsequently into digital time-series signals, normally a digital image processor which manipulates the image digitally, a signal recorder, e.g. magnetic disk or tape, and an image recorder for modulated light-exposure of a photographic film or an electronic signal display unit, e.g. cathode ray tube.

The terminology "X-ray conversion screen" as used herein refers to screens for use in conventional screen-film combinations or for use in stimulated luminescence radiography.

From the preceding description of said two X-ray recording systems operating with X-ray conversion phosphor screens in the form of a sheet, plate or panel it is clear that said screens serve only as intermediate imaging elements and do not form the final record. The final image is made or reproduced on a separate recording medium or display. The phosphor screens can be used repeatedly. Before re-use of the photostimulable phosphor screens a residual energy pattern is erased by flooding with light. The expected life of the phosphor screen is limited mainly by mechanical damage such as scratches.

Common X-ray conversion screens comprise in order: a support (also called substrate), a layer comprising phosphor particles dispersed in a suitable binder and a protective coating coated over the phosphor containing layer to protect said layer during use. Further, a primer layer is sometimes provided between the phosphor containing layer and the substrate to closely bond said layer thereto.

A radiographic screen whether it is photostimulable or not is generally prepared by the following manufacturing process.

Phosphor particles are mixed with a dissolved binder in a suitable mixing ratio to prepare a dispersion. Said dispersion is uniformly applied to a substrate by a known coating technique, e.g. doctor blade coating, roll coating, gravure coating or wire bar coating, and dried to form a luminescent layer fluorescing by X-ray irradiation and called hereinafter fluorescent layer. For the preparation of highly abrasion resistant and chemically resistant phosphor-binder layers the binder is cured. Curing of the binder may proceed photochemically by means of UV radiation or with electron beam (EB) as described e.g. in Research Disclosure December 1977, item 16435 or proceeds purely chemically as described e.g. in U.S. Pat. No. 4,508,636.

In the preparation of the radiation image storage panel having a primer layer between the substrate and the fluorescent layer, the prime layer is provided on the substrate beforehand, and then the phosphor dispersion is applied to the primer layer and driest to form the fluorescent layer. After the formation of the fluorescent layer, a protective layer is generally provided on top of the fluorescent layer.

Particularly in stimulable radiography wherein the X-ray conversion screen is in the form of a sheet and in several steps of its use is not protected inside a cassette but is handled as such, it is desired for the fluorescent layer not to peel-off readily from its substrate when the screen is bended. Therefore, the adherence of the fluorescent layer to its substrate should be as good as possible. The application of an ordinary adhesive such as gelatin described in U.S. Pat. No. 4,508,636 to form the primer layer for bonding the fluorescent layer to its substrate, e.g. a polyethylene terephthalate sheet support, does not satisfy when the fluorescent screen sheet is frequently bended. In U.S. Pat. No. 4,078,108 an improved adhesive layer for a polyethylene terephthalate support is described, wherein the binder of the adhesive layer consists of polyesters or copolyesters of isophthalic acid with an aliphatic diol, optionally in combination with saturated dicarboxylic acids, with a molecular weight of at least 4500, and 2 to 35% by weight on the dry binder of sulfonated castor oil. Such adhesive layer is coated from a solvent which requires a drying stage in the formation of the layer. Solvents used in the coating of said adhesive layer are chlorinated hydrocarbons such as chlorobenzene which solvent should be excluded from use when possible for ecological reasons.

SUMMARY OF THE INVENTION

It is an object of the present invention to provide a coating composition suitable for forming an adhesive primer layer on a hydrophobic resin support, e.g. a polyethylene terephthalate support, which coating composition can be coated without solvents to be removed by drying the coated layer, and wherein said primer layer forms an excellent bond with phosphor binder layers of luminescent articles such as X-ray conversion screens.

It is another object of the present invention to provide a luminescent article, more particularly an X-ray conversion screen in the form of a sheet, panel or web, wherein a supported phosphor-binder layer is strongly adhered by means of a primer layer to a hydrophobic resin support, e.g. a polyethylene terephthalate support.

It is a further object of the present invention to provide a luminescent article as described above wherein said primer layer is present at the side of the support opposite the phosphor-binder layer and serves to adhere a backing layer of cured resin material to said support.

It is a further object of the present invention to provide a method for the production of a luminescent article such as an X-ray conversion screen comprising a supported phosphor-binder layer adhered to its support by means of a primer layer, wherein in said method the primer layer is coated without use or with minor amounts of solvent(s) to be removed later on by drying.

Other objects and advantages of the invention will become clear from the following description and examples.

According to the present invention a coating composition suitable for forming an adhesive primer layer on a hydrophobic polyester resin support is provided, wherein said coating composition essentially consists of (an) addition polymerizable monomer or mixture of such monomers having dissolved therein at least one of the polymers (i) and/or (ii), wherein:

(i) is a linear copolyester of isophthalic acid and at least one other dibasic carboxylic acid with an aliphatic diol, said copolyester being soluble in methyl methacrylate for at least 10 g per 100 ml at 20° C., and/or (ii) is a linear polyester of terephthalic acid and/or isophthalic acid with an oxyalkylated bisphenol, said polyester being soluble in methyl methacrylate for at least 10 g per 100 ml at 20° C., and wherein said composition comprises said monomer(s) acting as solvent(s) for polymers (i) and/or (ii) in a 20 to 70% by weight ratio with respect to the totality of said polymer(s) and monomer(s).

The present invention provides further a luminescent article, comprising a supported phosphor-binder layer adhered to its support by means of a primer layer, wherein said primer layer essentially consists of a solid matrix of addition polymerized monomer(s) having molecularly distributed in said matrix at least one of said polymers (i) and/or (ii), wherein said matrix has been formed by monomer(s) wherein said polymers (i) and/or (ii) were dissolved in a 20 to 70% by weight ratio with respect to the totality of said polymer(s) and monomer(s).

The present invention provides a method for the production of a luminescent article containing a supported phosphor-binder layer adhered to its support by means of a primer layer, said method comprising the following steps:

(1) coating onto said support a layer of a liquid coating composition comprising a liquid monomer or mixture of monomers, wherein at least one of the following resins has been dissolved:

(i) a linear copolyester of isophthalic acid and at least one other dibasic carboxylic acid with an aliphatic diol, said copolyester being soluble in methyl methacrylate for at least 10 g per 100 ml at 20° C., (ii) a linear polyester of terephthalic acid and/or isophthalic acid with an oxyalkylated bisphenol, said polyester being soluble in methyl methacrylate for at least 10 g per 100 ml at 20° C., (2) radiation-curing said coated layer by addition polymerisation of said monomer(s) using ultra-violet radiation and a photoinitiator or electron beam radiation, and (3) coating a layer of a dispersion of phosphor particles in a solvent-binder mixture onto said radiation-cured coating, whereupon said layer is solidified by evaporation of said solvent or curing.

DETAILED DESCRIPTION OF THE INVENTION

According to a preferred embodiment the above resins (i) and (ii) have a softening point (ring & ball) not lower than 90° C. The ring & ball method for determining the softening point is described in: Annual Book of ASTM Standards (1985), Vol. 06.03, p. 1031–1037.

The polymers (i) and (ii) have preferably a tensile strength of at least 30 N/mm$^2$. determined by (for the applied testing machine reference is made to G. A. Patfoort "Polymers" An Introduction to their Physical Mechanical and Rheological Behaviour—(1974)—E. Story-Scientia P.V.B.A. Scientific Publishers Gent/Belgium, p. 134–136.

The weight-average molecular weight ($\overline{M}w$) determined by gel-permeation chromatography (GPC) of said polymers (i) and (ii) is preferably comprised between 10,000 and 30,000.

Preferred copolyesters (i) have an isophthalate content of at least 30% by weight.

Preferred dibasic acids that are combined with isophthalic acid in the formation of copolyesters (i) are C4–C10 dibasic acids, e.g. terephthalic acid and sebacic acid.

Examples of diols that may be used in the preparation of said copolyester (i) are: ethylene glycol, 1,4-butanediol, neopentyl glycol and 1,6-hexanediol, which diols may be used in combination.

Copolyesters (i) can be easily prepared by well-known polycondensation processes and representatives of them are commercially available under the tradename VITEL, e.g. VITEL PE 200 of the firm The Goodyear Tire & Rubber Co., Ohio, U.S.A, and are likewise commercially available in the group of Dynamit Nobel Chemicals under the tradename DYNAPOL of Hüls Aktiengesel lschaft, Postfach 1320 - D-4370 Marj, Germany. An example of the preparation of such copolyesters is described in U.S. Pat. No. 4,078,108.

The alkoxylated bisphenol used in the preparation of said polyesters and copolyesters (ii) is preferably within the scope of the following general formula:

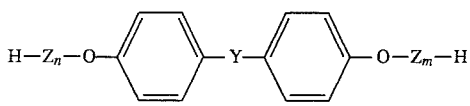

wherein:
Y represents an alkylidene group having from 1 to 4 C-atoms,

Z represents an oxyalkylene group wherein the alkylene group has 2 to 4 C-atoms, and m and n are integers 1 to 2. Preferred are ethoxylated and/or propoxylated bisphenol A compounds wherein bisphenol A stands for bis(4-hydroxyphenyl )-2,2'-propane.

Suitable propoxylated bisphenol A polyesters are on the market under the trade name ATLAC KTR 2300 and KTR 2959 of Atlas Chemical Industies N.V. (Everslaan 45, Everberg - Belgium).

The preparation of polyesters using an alkoxylated bisphenol is described e.g. in GB-P 1,373,220.

Primer layers having particularly good adherence to polyester resin supports such as polyethylene terephthalate supports are obtained by means of coating compositions wherein the above monomer(s) is (are) present in a 30 to 70% by weight ratio with respect to the totality of said polymer(s) and monomer(s) and form a solution with said polymer(s).

The use of said polymerizable liquid monomers polymerizing in situ in the coating makes it possible to dispense with organic solvents that have to be removed from the coated adhesive primer layer composition.

The addition polymerizable monomers may be monofunctional or plurifunctional by which is meant that they may contain one or more olefinically unsaturated groups. Examples of monofunctional addition polymerizable liquid toohomers that may serve as solvent for the above defined polymers (i) and (ii) are the following: methyl (metha)acrylate, ethyl acrylate, butyl acrylate, 2-ethylhexyl methacrylate, 2-hydroxyethyl acrylate, 2-hydroxyethyl methacrylate, glycidyl methacrylate, n-hexyl acrylate, lauryl acrylate, and tetrahydrofurfuryl methacrylate.

Preferred mono-functional monomers for use according to the present invention are methyl methacrylate and tetrahydrofurfuryl methacrylate.

Examples of suitable di-functional monomers are: 1,6-hexanediol diacrylate, 1,6-hexanediol dimethacrylate, neopentylglycol diacrylate, 1,4-butanediol diacrylate, ethyleneglycol diacrylate, polyethyleneglycol diacrylate, pentaerythritol diacrylate, divinylbenzene.

Acrylate 1,6-hexanediol diacrylate being a very good solvent for the applied resins (i) and (ii) is used preferably.

Examples of suitable tri- or more-functional monomers are: trimethylolpropane triacrylate, trimethylolpropane trimethacrylate, pentaerythritol triacrylate, dipentaerythritol hexaacrylate, an acrylate of ethylenediamine, aliphatic and aromatic urethane acrylates and the monomers according to general formula (I) described in non-published European patent application No. 91200468.6 filed Mar. 5, 1991, wherein reference is made for the preparation of said monomers to published German patent applications Nos. 3,522,005, 3,703,080, 3,643,216, 3,703,130, 3,703,080, 3,917,320 and 3,743,728.

When the radiation-curing is carried out with ultraviolet radiation (UV), a photoinitiator is present in the coating composition of the primer layer to serve as photo-radical former initiating the addition polymerization of the liquid monomers on UV-irradiation. Such results in the curing of the coated primer layer composition.

Photoinitiators suitable for use in photo-radical production belong to the class of organic carbonyl compounds, for example, benzoin ether series compounds such as benzoin isopropyl, isobutylether; benzil ketal series compounds; ketoxime esters; benzophenone series compounds such as benzophenone, o-benzoylmethylbenzoate; acetophenone series compounds such as acetophenone, trichloroacetophenone, 1,1-dichloroacetophenone, 2,2-diethoxyacetophenone, 2,2-dimethoxy-2-phenyl acetophenone; thioxanthone series compounds such as 2-chlorothioxanthone, 2-ethylthioxanthone; and compounds such as 2-hydroxy-2-methylpropiophenone, 2- hydroxy-4'-isopropyl -2-methyl propiophenone, 1-hydroxycyclohexyl phenyl ketone; etc.

A particularly preferred photoinitiator is 2-hydroxy-2-methyl-1-phenyl-propan-1-one which product is marketed by E. Merck, Darmstadt, Germany under the tradename DAROCUR 1173.

The above mentioned photopolymerization initiators may be used alone or as a mixture of two or more.

Photosensitizers may be used in conjunction with said photo-radical formers, e.g. aromatic amino compounds as described in GB-P 1,314,556, 1,486,911, U.S. Pat. Nos. 4,255,513 and 4,987,230—and merocyanine and carbostyril compounds as described in U.S. Pat. No. 4,282,309.

To the radiation-curable coating composition of the primer layer there may be added a storage stabilizer, a colorant, and other additives. Examples of colorants that can be used in the primer layer improving image sharpness obtained with X-ray conversion phosphor screens are e.g. MAKROLEX ROT EG, MAKROLEX ROT GS and MAKROLEX ROT E2G. MAKROLEX is a registered tradename of Bayer AG, Leverkusen, Germany.

When using ultraviolet radiation as curing source the photoinitiator which needs to be added to the coating solution will to a more or less extent also absorb the light emitted by the phosphor thereby reducing the sensitivity of the radiographic screen, particularly when a phosphor emitting UV or blue light is used. So, when the X-ray conversion screen contains a green light emitting phosphor a photoinitiator has to be chosen of which the absorption range overlaps to a minimum degree with the emission range of said phosphor. A preferred photoinitiator is 2-hydroxy-2-methyl-1-phenyl-propan-1-one marketed under the tradename DAROCUR 1173 of E. Merck, Darmstadt, Germany.

The amount of the photoinitiator used is preferably within the range of 0.01 to 5 parts by weight relative to 100 parts by weight of the addition polymerizable monomer(s).

Apart from the above defined compounds the primer layer composition may contain additives playing a role in the coating stage or in the final layer during radiographic imaging. Examples of such additives are surfactants, solid lubricants, e.g. waxes, defoamers, anti-static agents, plasticizers and solid particles, e.g. pigments, that may be reflective or absorptive with regard to the fluorescent radiation emitted by the phosphor of an X-ray intensifying screen, or that are reflective or absorptive with regard to the stimulation light used in the photostimulation of photostimulable phosphor screens. An example of a particularly suitable light absorbing pigment material is carbon black. Examples of visible light reflecting pigments are, titanium dioxide, magnesium oxide , barium sulfate, calcium carbonate and magnesium carbonate. $MgTiO_3$ is a useful pigment reflecting ultraviolet light in the range of 300 to 400 nm (ref. the periodical COATING 9/88, p.352). The reflection layer may serve to reflect at least part of the prompt emission of the storage phosphor screen which prompt emission for the part that it is UV-radiation may yield an increase in stored energy. UV-light represents storable energy in addition to X-ray energy since most of the photostimulable phosphors have also storage capacity for the energy contained in ultraviolet light.

According to a particular embodiment the photostimulable storage phosphor layer of a storage phosphor screen during its X-ray exposure is held in contact with a phosphor screen that has prompt emission of UV-light when struck by X-rays. An X-ray intensifying screen containing a phosphor layer on the basis of $(Y,Sr,Li)TaO_4.Nb$, as disclosed in EP-A-O 202 875 has UV-light prompt emission with a maximum at 320 nm and is useful for application in said embodiment, e.g. in combination with a photostimulable storage phosphor screen containing an europium(II) doped barium fluoride/bromide storage phosphor.

The coating of the primer layer composition may proceed according to any conventional method such as doctor blade coating, dip-coating or roll coating. The thickness of the primer layer in solid state is preferably in the range of 5 to 30 micron.

Examples of support materials whereto the above defined primer layer composition may be applied include cardboard, plastic films such as films of cellulose acetate, polyvinyl chloride, polyvinyl acetate, polyacrylonitrile, polystyrene, polyester, e.g. polyethylene terephthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. A polyethylene terephthalate film is preferably employed as the support material.

A resin support may contain a light-absorbing material such as carbon black, or may contain a light-reflecting material such as titanium dioxide or barium sulfate or may be coated, e.g. by vacuum deposition, with a light reflecting metal, e.g. aluminium. Light-absorbing supports are appropriate for preparing a high-resolution type radiographic screen, while light-reflecting supports are appropriate for preparing a high-sensitivity type radiographic screen.

The support may have a thickness between 60 and 1000 micron, more preferably between 80 and 500 micron from the standpoint of handling.

Apparatus and Methods for Curing

Apparatus for radiation curing are known to those skilled in the art and are commercially available. When applying a photoinitiator in the primer layer composition the curing can proceed advantageously with ultraviolet radiation. For example, the curing proceeds with medium pressure mercury arc lamps or pulsed xenon arcs. These ultraviolet sources usually are equipped with a cooling installation, an installation to remove the produced ozone and a nitrogen inflow to exclude air from the surface of the product to be cured during radiation processing. An intensity of 40 to 120 W/cm in the 200–400 nm region is usually employed. An example of a commercially available ultraviolet source is IST supplied by Strahlentechnik, Oberboihingen, W. Germany.

High energy ionizing radiation such as X-rays, gamma rays, beta rays and accelerated electrons can also be used to accomplish curing of the coating. Typically, the radiation used should be of a sufficient intensity to penetrate substantially all the way through the coated layer. The total dosage employed should be sufficient to bring about curing of the radiation curable coating composition to form a solid layer.

UV radiation is better suited for non-pigmented or slightly pigmented systems having relatively thin films to allow full penetration of the irradiation. For highly pigmented coatings, polymerization is best achieved by electron beam (EB) curing because EB curing can penetrate through thicker coatings; up to 300 micron depending on the value of the electron accelerating voltage and on the absorption capacity of the coatings.

There are two types of electron beam accelerators: high energy scanner types and low energy linear-cathode types also called electrocurtain type accelerators. These accelerators are usually equipped with nitrogen inflow. A dose in the range of 0.01 to 10 megarads is employed. Examples of commercially available EB accelerators are PILOT 200 and CB175/60/380 both supplied by Energy Sciences Inc., Geneva, Switzerland. Electron beam curing is described e.g. in the periodical Adhäsion 1990—Heft 12, pages 39-40.

Curing periods may be adjusted to be very short by proper choice of radiation source, monomer(s), photoinitiator and concentration thereof, and the distance between the radiation source and the product to be cured. Curing periods of about I second duration are possible, especially in thin (10 to 50 micron) coatings. For thicker cured products, curing periods of 1–2 minutes are operable.

The primer layer compositions of the present invention may applied for the adherence of any type of phosphor binder layer; a non-limitative survey of X-ray conversion screen phosphors being given hereinafter.

In the case of a conventional X-ray intensifying screen the phosphor used is a fluorescent substance that has a good prompt emission of ultraviolet radiation and/or visible light when struck by penetrating X-ray radiation and low afterglow.

Non-limitative Survey of Phosphors Used in X-ray Intensifying Screens

Such phosphors are e.g.: calcium tungstate, zinc sulfide, zinc cadmium sulfide, zinc oxide and calcium silicate, zinc phosphate, alkali halides, cadmium sulfide, cadmium selenide, cadmium tungstate, magnesium fluoride, zinc fluoride, strontium sulfide, zinc sulfate, barium lead sulfate, barium fluorohalides, and mixtures of two or more of the above. The above phosphors may be activated with, for example, europium, silver, copper, nickel. Phosphors which are particularly suitable for use in high speed X-ray conversion screens are those selected from fluorescent substances containing elements with atomic number 39 or 57 to 71, which include rare earth elements such as yttrium, gadolinium, lanthanum and cerium. Particularly suitable are the rare earth oxysulfide and oxyhalide fluorescing materials activated with other selected rare earths e.g. lanthanum and gadolinium oxybromide and oxychloride activated with terbium, ytterbium or dysprosium, lanthanum and gadolinium oxysulfides activated with terbium, europium, or a mixture of europium and samarium, yttrium oxide activated with gadolinium, europium, terbium or thulium, yttrium oxysulfide activated with terbium or a mixture of terbium and dysprosium, yttrium tantalate doped with small amounts of terbium or strontium or lithium or a mixture thereof and activated with thulium, niobium, europium, gadolinium, neodymium. These and other rare earth fluorescent materials have been extensively described in the literature for which we refer, e.g., to EP 11909, EP 202875, EP 257138, DE 1282819, DE 1952812, DE 2161958, DE 2329396, DE 2404422, FR 1580544, FR 2021397, FR 2021398, FR 2021399, UK 1206198, UK 1247602, UK 1248968, U.S. Pat. No. 3,546,128, U.S. Pat. No. 3,725,704, U.S. Pat. No. 4,220,551, U.S. Pat. No. 4,225,653, also to K. A. Wickersheim et al. "Rare Earth Oxysulfide X-ray Phosphors", in the proceedings of the IEEE Nuclear Science Symposium, San Francisco, Oct. 29–31, 1969, to S. P. Wang et al., IEEE Transactions on Nuclear Science, February 1970, p. 49–56, and to R. A. Buchanan, IEEE Transactions on Nuclear Science, February 1972, p. 81–83. A survey of blue light and green light emitting phosphors is given in EP 88820.

By using a plurality of phosphor layers of different composition or by using a radiographic screen containing a mixture of different phosphors a fluorescence over the whole visible spectrum can be obtained, so that such combination is particularly useful for recording with silver halide recording elements that have been made spectrally sensitive for light of the whole visible spectrum.

A particularly preferred two-layer phosphor combination comprises coating on a support as described hereinafter a first phosphor layer on the basis of $(Y,Sr,Li)TaO_4.Nb$, as disclosed in EP-A-O 202 875, and thereupon a second phosphor layer on the basis of $CaWO_4$. To either of these phosphor layers, in particular to the first phosphor layer may be added colorants in view of the enhancement of the image sharpness. Suitable colorants for this purpose are disclosed e.g. in EP-0 178 592 and U.S. Pat. No. 3,164,719.

Non-limitative Survey of Photostimulable Phosphors

The photostimulable phosphor used in a stimulable X-ray conversion screen is a phosphor which emits fluorescent light on being irradiated with stimulating excitation light after X-ray irradiation. In practice a stimulable phosphor is preferred which can be stimulated effectively in the wavelength region of 400 to 700 nm and is emitting fluorescent light of wavelength sufficiently differing from the wavelength of the stimulating light.

Suitable stimulable phosphors are described e.g. in EP 304121, EP 345903, EP 353805, EP 382295, U.S. Pat. No. 3,859,527, U.S. Pat. No. 4,236,078, U.S. Pat. No. 4,239,968, JP 73/80487, JP 73/80488, JP 73/80489, JP 76/29889, JP 77/30487, JP 78/39277, JP 79/47883, JP 80/12142, JP 80/12143, JP 80/12144=U.S. Pat. No. 4,236,078, JP 80/12145, JP 80/84389, JP 80/160078, JP 81/116777, JP 82/23673, JP 82/23675, JP 82/148285, JP 83/69281 and in JP 84/56479.

The photostimulable X-ray conversion screen may contain an assemblage of photostimulable phosphor layers containing one or more photostimulable phosphors. The stimulable phosphors contained in distinct photostimulable phosphor layers may be either identical or different. In the phosphor layers the phosphor particles may be of same or different chemical structure and when different in structure may be of same or different particle size and/or distribution.

It is general knowledge that sharper images with less noise are obtained with phosphor particles of smaller mean particle size, but light emission efficiency declines with decreasing particle size. Thus, the optimum mean particle size for a given application is a compromise between imaging speed and image sharpness desired.

According to a particular embodiment the present luminescent articles, also called radiographic screens, are used in non-detructive testing (NDT) of metal objects, where more energetic X-rays and gamma rays are used than in medical X-ray applications.

In screens applied for industrial radiography it has been found advantageous to combine the fluorescent phosphor layer with a metal layer or metal support, wherein the metal has an atomic number in the range of 46 to 83 as described e.g. in U.S. Pat. Nos. 3,872,309 and 3,389,255. The metal layer in contact with the phosphor-containing layer acts as an emitter of photoelectrons and secondary X-rays when struck by highly energetic X-rays or gamma rays. The secondary lower energy X-rays and photo-electrons are absorbed in the adjacent phosphor-containing layer at a higher efficiency than the highly energetic X-rays and gamma rays emitted by an industrial X-ray apparatus, such results in an increase in photographic speed. Said metal layers or supports have the additional advantage of reducing the scattered radiation whereby image-sharpness is improved.

According to a particular embodiment described in Research Disclosure September 1979, item 18502 image-sharpness is improved by incorporating in the X-ray intensifying screen between the phosphor-containing layer and the support and/or at the rearside of the support a pigment-binder layer containing a non-fluorescent pigment being a metal compound, e.g. salt or oxide, of a heavy metal whose atomic number (Z) is at least 46. A preferred pigment used for that purpose is lead oxide (PbO) being applied e.g. at a coverage of 100 to 400 g of lead per $m^2$.

In a particular X-ray recording method the fluorescent light output of prompt emission and stimulated emission of a phosphor or mixture of phosphors are combined. For said purpose the conversion screen contains a phosphor or mixture of phosphors having prompt emission and stimulation emission properties.

Said method comprises the steps of:
(1) arranging a silver halide emulsion layer material with its silver halide emulsion side in contact with a phosphor screen containing phosphor particles having the property of prompt emission of fluorescent light when irradiated with high energy radiation e.g. X-ray radiation, and the property of storing energy contained in said high energy radiation with the possibility to release the stored energy by photo- and/or heat stimulation,
(2) exposing said arrangement information-wise to said penetrating radiation causing the prompt emission of fluorescent light into said silver halide emulsion layer,
(3) releasing from said phosphor screen the releasably stored energy of the high energy irradiation pattern in the form of fluorescent light that exposes said silver halide emulsion layer in congruency with said prompt emission.

According to an embodiment of said method, being applied advantageously in mammography, a single-side coated silver halide emulsion film having a transparent support is arranged inside a cassette with its silver halide emulsion layer in contact with one screen. The cover of the cassette directed to the emulsion-free side of the film is transparent to stimulation light so that said light can reach the phosphor of the screen through the transparent support and its silver halide emulsion layer. The silver halide of said silver halide emulsion layer is not spectrally sensitive to said stimulation light, which is e.g. red light (600–700 nm). Following the X-ray exposure the cassette is kept out of day-light and stimulation light is projected through the transparent cover lid of the cassette.

By applying said method the total photographic speed is substantially higher than on using separately prompt and stimulation emission radiation, and X-ray radiation dose can be diminished for a same speed.

The image sharpness obtained in a system operating with a single side coated film and only one contacting phosphor screen is much better than obtained with double-side coated silver halide emulsion film arranged inbetween two phosphor screens because of the absence of sharpness-reducing cross-over of fluorescent light penetrating the transparent support of the double-side coated film.

Phosphors having prompt emission and photostimulation emission in about 1 to 1 ratio are $Eu^{2+}$ doped barium fluorhalide phosphors described for the use of their prompt emission in GB-P I 419 169 and for the use of their stimulation emission in DE-P 2,928,244 and U.S. Pat. No. 4,258,264.

In a particular embodiment of said method infra-red stimulable phosphors are used. The use of the stimulation emission of such phosphors in conjunction with silver halide emulsion layer recording materials is described in U.S. Pat. No. 2,482,813. Other infra-red stimulable phosphors are described for stimulation radiography in U.S. Pat. Nos. 3,859,527 and 4,616,135.

In U.S. Pat. No. 3,859,527 also storage phosphors are described that release their stored energy by heat.

An embodiment based on the use of heat-stimulable phosphors having also prompt emission operates e.g. with a classical double-side coated silver halide emulsion film being present in a cassette between X-ray conversion screens (front and back screen). The screens having the property of prompt emission and stimulation emission by heating are arranged each in contact with the inner wall of a heat-conductive cassette cover lid. After the information-wise exposure to X-rays the phosphor screens are integrally heated, e.g. inside the cassette by Joule heating of an electrically conductive coating between the phosphor layer and its support as described e.g. in GB-P 1,462,769, or the phosphor screens are integrally heated by means of an external heating source, e.g. infra-red radiation source, heating roller, heating platen or hot air. An efficient transfer of heat into the the phosphor layers proceeds through a thermally conductive support such as an aluminium sheet adhered to an X-ray transparent thermally conductive cassette cover lid.

In the above defined X-ray recording method phosphor screens may be used that contain phosphor particles having practically only prompt emission capability in admixture with phosphor particles that have mainly X-ray radiation energy storage capacity and are photo- and/or thermally stimulable. An example of such screen is a screen wherein calcium wolframate phosphor particles are applied in admixture with $BaFBr:Eu^{2+}$ phosphor particles.

According to an embodiment the image-wise stored energy in a storage phosphor is released by applying an electric field as described e.g. by R. W. Pohl in "Optik und Atomphysik" Springer-Verlag (1958), p. 325. The electric field is advantageously a high frequency field known as Teslafield. In that embodiment the phosphor layer is applied preferably on an electrically conductive support or interlayer, e.g. vacuum-deposited aluminium layer, being connected to one of the electrodes of a voltage source for applying the electric field over the phosphor-containing layer. The application of a stimulating electric field can be combined with photoand/or thermostimulation.

Non-limitative Survey of Binders of the Phosphor Containing Layer

In most applications the phosphor layers contain sufficient binder to give structural coherence to the layer. In view of a possible phosphor recovery from worn-out screens a binder of the phosphor containing layer is chosen that remains soluble after coating.

Useful binders include proteinaceous binders, e.g. gelatin, polysaccharides such as dextran, gum arabic, and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate, cellulose acetate butyrate, polyvinyl alcohol, polystyrene, polyester, polycarbonate and polyester-carbonates. These and other useful binders are disclosed in U.S. Pat. No. 2,502,529, U.S. Pat. No. 2,887,379, U.S. Pat. No. 3,617,285, U.S. Pa 3,300,310, U.S. Pat. No. 3,300,311 and U.S. Pat. No. 3,743,833 and published European Patent Application 0 414 066.

A mixture of two or more of these binders may be used, e.g., a mixture of polyethyl acrylate and cellulose acetobutyrate.

The weight ratio of phosphor to binder determines the light emission of the screen and the image-sharpness. Generally, said ratio is within the range of from 1:1 to 100:1, preferably from 80:20 to 95:5.

Thickness of the Phosphor Layer

The thickness of the phosphor layer, which may differ depending on the sensitivity of the radiographic screen to radiation, the kind of the phosphor, etc., may be within the range of from 5 to 1000 micron, preferably from 50 to 500 micron, more preferably from 150 to 500 micron.

Two or more phosphor layers with different thickness and/or different binder:phosphor ratio and/or different phosphor particle size may be used.

Radiographic screens in particular those comprising conventional non-stimulable phosphors as described above can also be in the form of gradual screens, i.e. screens having a gradual intensification along their length and/or width. Graduality can be achieved by gradually increasing the thickness of the phosphor layer over the length or width of the screen or by incorporating into a protective layer or into an interlayer between the protective layer and phosphor containing layer a gradually increasing amount of dye capable of absorbing the light emitted by the phosphor.

Coating of the Phosphor Layer

Before coating the phosphor particles and binder are added to an appropriate solvent as described hereinafter, and then mixed to prepare a coating dispersion comprising the phosphor particles homogeneously dispersed in the binder solution. Said coating dispersion may further comprise a dispersing agent and plasticizer and filler material as described hereinafter.

The coating dispersion containing the phosphor particles and the binder is applied uniformly onto the surface of the primed support to form a layer of the coating dispersion. The coating may proceed according to any conventional method such as doctor blade coating, dip-coating or roll coating.

After applying the coating dispersion onto the support, the coating dispersion is then heated slowly to dryness so as to complete the formation of a solid phosphor layer.

In order to remove as much as possible entrapped air in the phosphor coating composition it can be subjected to an ultra-sonic treatment before coating and/or deaeration by applying reduced pressure. Before applying the protective coating composition the phosphor-binder layer (as described e.g. in U.S. Pat. No. 4,059,768) can be calendered to improve the phosphor packing density in the dried layer.

Useful Solvents for the Binder of the Phosphor Containing Layer

Examples of solvents employable in the preparation of the phosphor coating dispersion include lower alcohols such as methanol, ethanol, n -propanol and n-butanol; chlorinated hydrocarbons such as methylene chloride and ethylene chloride; ketones such as acetone, butanone, methyl ethyl ketone and methyl isobutyl ketone; 2-methoxy-propanol; esters of lower alcohols with lower aliphatic acids such as methyl acetate, ethyl acetate and butyl acetate; ethers such as dioxane, ethylene glycol monoethylether; methyl glycol; and mixtures of the above-mentioned solvents.

Useful Dispersing Agents

The coating dispersion may contain a dispersing agent to improve the dispersibility of the phosphor particles therein, and may contain a variety of additives such as a plasticizer for increasing the bonding between the binder and the phosphor particles in the phosphor layer.

Examples of the dispersing agent include ionic and nonionic well-known dispersing agents or combinations thereof, e.g., GAFAC RM 610 (tradename) a polyoxyethylene (20) sorbitan monopalmitate and monolaurate marketed by General Aniline and Film Company (GAF), New York, USA, polymeric surfactants such as the acrylic graft copolymer, PHOSPHOLIPON 90 (tradename) marketed by Nattermann-Phospholipid GmbH, Köln, W. Germany, silane dispersing agents and surfactants e.g. DOW CORNING 190 (tradename) and SILANE Z6040 (tradename) marketed by Dow Corning Corporation, Midland, Mich., USA or glymo 3-glycidyloxypropylmethoxysilane or organosulfate polysilanes, unsaturated p-aminamide salts and high molecular acid esters such as ANTI TERRA U 80 (tradename) marketed by BYK-Chemie GmbH, Wesel, W. Germany, high molecular unsaturated polyesters. Dispersing agents are added in an amount of 0.05 to 10% by weight as compared to the phosphor.

Useful Plasticizers

Examples of plasticizers include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; polymeric plastizers, e.g. and polyesters of polyethylene glycols with aliphatic dicarboxylic acids such as polyester of triethylene glycol with adipic acid and polyester of diethylene glycol with succinic acid.

Useful Fillers

The coating dispersion of the phosphor layer or of a protective layer may also contain a filler (reflecting or absorbing) or may be colored by a colorant capable of absorbing light within the spectrum emitted by the phosphor or capable of absorbing excitation light in the case of a stimulable X-ray conversion screen. Examples of colorants include Solvent Orange 71 (Diaresin Red 7), Solvent Violet 32 (Diaresin Violet A), Solvent Yellow 103 (Diaresin Yellow C) and Solvent Green 20 (all four supplied by MitsubishiChemical Industries, Japan), Makrolex Rot GS, Makrolex Rot EG, Makrolex Rot E2G, Helioechtgelb 4G and Helioechtgelb HRN (all five marketed by Bayer, Leverkusen, Germany), Neozaponfeuerrot G and Zaponechtbraun BE (both marketed by BASF, Ludwigshafen, W. Germany).

The primer layer composition according to present invention is not only useful in the adhering of phosphor-binder layers to hydrophobic resin supports but has also excellent bonding properties with regard to a large variety of resin layers that serve as interlayer or backing layer on said supports.

In the manufacture of radiographic screen sheet materials the coating of a relatively thick phosphor-containing layer on one side of a flexible support may cause on drying of said layer a certain curl up of the screen sheet material. Such can be avoided by providing a backing layer at the side of the support opposite the phosphor containing layer. Said backing layer, called anti-curl layer, has to compensate for the surface contracting tensile stress created by the phosphor layer at one side of the sheet material and provides itself a contracting force (shrinking) while adhering strongly to the primer layer after coating.

According to a preferred embodiment such backing layer is made from a radiation-curable composition containing as primary components:

(1) a crosslinkable prepolymer or oligomer, (2) a reactive sol vent monomer dissolving (1), and (3) in the case of an UV curable formulation a photoinitiator.

Suitable amounts of these primary components calculated on the total coating composition are 30–100% by weight for the prepolymer, 10–70% by weight for the reactive monomer and 0–10% by weight for the photoinitiator. Optionally minor amounts (e.g. 5% by weight) of non-reactive organic solvent for the prepolymer may be present.

Examples of suitable prepolymers for use in a radiation-curable composition of the backing layer applied according to the present invention are the following: unsaturated polyesters, e.g. polyester acrylates; urethane modified unsaturated polyesters, e.g. urethane-polyester acrylates. Liquid polyesters having an acrylic group as a terminal group, e.g. saturated copolyesters which have been provided with acryltype end groups are described in published EP-A 0 207 257 and Radiat. Phys. Chem., Vol. 33, No. 5,443–450 (1989). The latter liquid copolyesters are substantially free from low molecular weight, unsaturated monomers and other volatile substances and are of very low toxicity (ref. the journal Adhäsion 1990 Heft 12, page 12). The preparation of a large variety of radiation-curable acrylic polyesters is given in German Offenlegungsschrift No. 2838691. Mixtures of two or more of said prepolymers may be used. A survey of UV-curable coating compositions is given e.g. in the journal "Coating" 9/88, p. 348–353.

Other backing layers can be obtained by the use of prepolymers also called oligomers of the class of aliphatic and aromatic polyester-urethane acrylates. The structure of polyester-urethane acrylates is given in the booklet "Radiation Cured Coatings" by John R. Constanza, A. P. Silveriand Joseph A. Vona, published by Federation of Societies for Coatings Technology, 1315 Walnut St. Philadelphia, Pa. 19107 USA (June 1986) p. 9.

The structure of particularly useful aromatic polyester-urethane acrylate prepolymers is illustrated by the following general formula:

and concentration determines the speed wherein the mechanically implied embossed structure becomes flattened before curing.

According to still another embodiment the embossed structure is obtained by incorporating in the coating composition of the backing layer finely divided particles that protrude from the coated and solifified layer. These finely divided protruding particles act as so-called spacing agents. Suitable spacing agents in the form of friction reducing polymer beads are descibed in U.S. Pat. No. 4,059,768. Said beads may be added in amounts such that at least 9 beads are protruding per 0.25 cm$^2$ of the backing layer being an

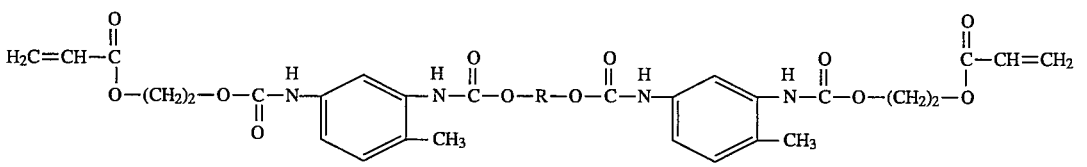

wherein R is a C2 to C6 alkylene group.

In the synthesis of said aromatic urethane first tolylene 2,4-diisocyanate is used in a polyaddition reaction with aliphatic diols and the polymerizable double bond end structures are introduced by reaction of terminal isocyanate groups with 2-hydroxyethyl acrylate. In the synthesis of aliphatic urethane acrylates an alkylene diisocyanate is used, e.g. 1,6-diisocyanatohexane.

Examples of the preparation of aliphatic polyester-urethane acrylates, are given in U.S. Pat. No. 4,983,505 and in DE 2530896.

The introduction of a plurality of acrylic double bonds per polymer chain of the prepolymer proceeds by first effecting a partial esterification of a polyol, e.g. pentaerythritol, with acrylic acid and a subsequent reaction of the still free HO-group(s) of the polyol with a polyfunctional isocyanate.

Said backing layer may have the same composition as the protective layers described in unpublished EP-A 91201009.7 filed Apr. 26, 1991 which also contains particulars about the coating procedure and has to be read in conjunction herewith. Coating of said backing layer coating composition proceeds advantageously by means of a coating technique known as silk screen printing illustrated in last-mentioned EP-A.

When applying said coating technique the liquid coating composition of said backing layer preferably has at the coating temperature a viscosity of at least 450 mPa.s, the viscosity being measured at that temperature with a Hoeppler viscometer.

The backing layer may have a micro-relief structure obtained e.g. by giving it an embossed structure in the coating stage, e.g. by using a gravure roller or screen for applying the liquid coating composition having a high viscosity as defined above and rapidly curing it after coating.

According to a particular embodiment the surface of the backing layer is given an embossed structure following the coating stage by passing the uncured or slightly cures coating through the nip of pressure rollers wherein the roller contacting said coating has a micro-relief structure so as to obtain relief parts having a height in the range of 0.1 to 10 micron. A process for forming a textured structure in a plastic coating by means of engraved chill roll is described in U.S. Pat. No. 3,959,546.

The surface roughness of an outermost coating can be controlled by the use of a flowing agent, the type of which outermost layer. A micro-relief surface structure of the backing layer of radiographic screens reduces the built up of static electricity on transport and offers the possibility of complete flat positioning by allowing air to escape easily in a vacuum contact frame.

The invention is illustrated by the following examples without however limiting it thereby. All ratios, parts and percentages are by weight unless mentioned otherwise.

EXAMPLE 1

A polyethylene terephthalate foil having a thickness of 250 micron was coated with an adhesive primer layer coating composition consisting of:

30 parts of a copolyester of isophthalic acid, terephthalic acid, sebacic acid (35/60/5), and a mixture of ethylene glycol and neopentyl glycol (50/50) [softening point (ring & ball) of 151° C., tensile strength 42 N/mm$^2$]

70 parts of 1,6-hexanediol diacrylate, and 10 parts of 2-hydroxy-2-methyl-1-phenyl-propan-1-one.

Said composition was coated at a wet coating thickness of 10 micron and radiation-cured with ultra-violet radiation emitted by a commercially available UV-radiation unit LABCURE UNIT (supplied by Technigraf GmbH, Grävenwiesbach, Germany) having an energy output of 80 W/cm, operating at a put-through speed of 5 m/min, positioned with its UV source at a distance of 11 cm from the adhesive layer to be cured.

After UV-curing to the adhesive layer a phosphor-containing layer was applied from the following coating composition:

| | |
|---|---|
| calcium tungstate | 10,000 g |
| ethyl acetate | 2,000 g |
| cellulose actobutyrate | 800 g |
| polyethyl acrylate | 280 g |
| toluene | 200 g |
| methyl glycol acetate | 100 g |
| methyl ethyl ketone | 1,600 g |

The thickness of the dried phosphor-containing layer was 200 micron.

The obtained fluorescent X-ray intensifying screen was subjected to a folding test for assessing the adherence of the phosphor-containing layer to the primed polyethylene terephthalate support.

The phosphor layer was folded several times at the same place and the number of foldings was noted before crease appeared in the folded area. Creasing was accompanied by the interpenetration of air between the primer layer and the support sheet.

A good adherence corresponds with at least 5 foldings before air interpenetration in the folded area takes place.

The applied primer layer withstood more than 15 foldings before any crease could be detected.

EXAMPLE 2

Example 1 was repeated with the difference that in the adhesive primer layer composition 1,6-hexanediol diacrylate was replaced by a same amount of methyl methacrylate and the amount of the radical former 2-hydroxy-2-methyl-1-phenyl-propan-1-one was doubled.

The applied primer layer withstood more than 15 foldings before any crease could be detected.

EXAMPLE 3

Example 1 was repeated with the difference that in the adhesive primer layer composition 1,6-hexanediol diacrylate was replaced by a same amount of tetrahydrofurfuryl methacrylate and the amount of the radical former 2-hydroxy-2-methyl-1-phenylopropan-1-one was doubled.

The applied primer layer withstood 18 foldings before any crease could be detected.

EXAMPLE 4

Example 1 was repeated with the difference that the adhesive primer layer was coated from the following composition:

- 30 parts of a copolyester of terephthalic acid/isophthalic acid (3/2), and ethylene glycol/neopentyl glycol (3/2) [softening point (ring & ball) of 155° C., tensile strength of 68 N/mm$^2$]
- 70 parts of methyl methacrylate, and
- 10 parts of 2-hydroxy-2-methyl-1-phenyl-propan-1-one.

The obtained X-ray intensifying screen was subjected to the above defined folding test and withstood 15 foldings before any crease could be detected.

EXAMPLE 5

Example 1 was repeated with the difference that the adhesive primer layer was coated from the following composition:

- 30 parts of a copolyester of terephthalic acid, and a mixture of oxyethylated bisphenol A/propoxylated bisphenol A (30/70) [softening point (ring & ball) of 60° C., tensile strength 10 N/mm$^2$]
- 70 parts of 1,6-hexanediol dimethacrylate, and
- 5 parts of 2-hydroxy-2-methyl-1-phenyl-propan-1-one.

The obtained X-ray intensifying screen was subjected to the above defined folding test and withstood 5 foldings before any crease could be detected.

EXAMPLE 6

Example 2 was repeated with the difference that the polyethylene terephtalate support had only a thickness of 100 micron and prior to coating the phosphor-containing layer also an adhesive primer layer was coated at the rear side of the support.

Onto last-mentioned adhesive layer an anti-curl layer was applied from the following coating composition:

80/20 ratio mixture of prepolymers (as defined hereinafter) with the diluent monomer hexane diol diacrylate (HDDA).

The prepolymers consisted in a 70/30 ratio of (1) an aliphatic polyether-urethane acrylate having per polymer chain 6 acrylic double bonds, an average molecular weight of 1000, and Hoeppler viscosity at 25° C. of 100,000 mPa.s], and (2) an aliphatic polyester-urethane acrylate having per polymer chain 3 acrylic double bonds, an average molecular weight of 1500, said pre-polymer being mixed with 15% of HDDA [Hoeppler viscosity of (2) at 60° C.=30,000 mPa.s].

The photoinitiator DAROCUR 1173 (tradename) was added in a 5% ratio with respect to the coating composition.

The radiation curable coating composition of the anti-curl layer had a Hoeppler viscosity of 4563 mPa.s at 20° C., the coating temperature.

Coating Procedure

Onto a primer layer as described hereinbefore in Example 1 but applied at the rear side of the polyethylene terephthalate an anti-curl layer was coated with wire bar (K BAR No. 2 of RK Print-Coat Instruments Ltd. South View Laboratories, Lillington, Royston, Herts., SG80QZ, UK) at a coating thickness of 12.8 micron.

The anti-curl layer coating composition (see Example 1 of unpublished EP-A 91201009.7) was prepared by mixing in a 80/20 ratio a mixture of prepolymers with the diluent monomer 1,6-hexanediol diacrylate (HDDA). Said mixture of prepolymers consisted in a 70/30 ratio of (1) an aliphatic polyether-urethane acrylate having per polymer chain 6 acrylic double bonds, an average molecular weight of 1000, and Hoeppler viscosity at 25° C. of 100,000 mPa.s], and (2) an aliphatic polyester-urethane acrylate having per polymer chain 3 acrylic double bonds, an average molecular weight of 1500, said pre-polymer being mixed with 15% of HDDA [Hoeppler viscosity of (2) at 60° C.=30,000 mPa.s].

The photoinitiator DAROCUR 1173 (tradename) was added in a 5% ratio with respect to the coating composition.

The radiation curable coating composition A had a Hoeppler viscosity of 4563 mPa.s at 20° C., the coating temperature.

The radiation curing of the anti-curl layer proceeded as described for the adhesive layer.

Before coating the phosphor-containing layer the material was subjected to the above defined folding test and withstood more than 15 foldings before any crease at the interface of the anti-curl layer and primer layer layer could be detected.

We claim:

1. A luminescent radiographic system comprising a support, a non-cured phosphor-binder layer, and between said support and phosphor-binder layer a primer layer, wherein said primer layer consists essentially of a matrix of at least one addition polymerized monomer having molecularly distributed in said matrix at least one member selected from the group consisting of polymer (i) which is a linear copolyester of isophthalic acid and at least one other dibasic carboxylic acid with an aliphatic diol, said copolyester being soluble in methyl methacrylate for at least 10 g per 100 ml at 20° C., and polymer (ii) which is a linear polyester of terephthalic acid, said polyester being soluble in methyl methacrylate for at least 10 g per 100 ml at 20° C.; and wherein said matrix has been formed by said monomer(s) in which at least one of said polymers (i) and (ii) were dissolved in a 20 to 70% by weight ratio with respect to the totality of said polymer(s) and monomer(s).

2. The luminescent system according to claim 1 wherein in polymer (ii) said linear polyester of terephthalic acid is the linear polyester of terephthalic and isophthalic acid with an oxyalkylated bisphenol.

3. The luminescent system according to claim 1 wherein said polymers (i) and (ii) have a tensile strength of at least 30 N/mm$^2$.

4. The luminescent system according to claim 1 wherein said polymers (i) and (ii) have a softening point (ring and ball) not lower than 90° C.

5. The luminescent system according to claim 1 wherein the weight average molecular weight (Mw) of both of said polymers (i) and (ii) is between 10,000 and 30,000.

6. The luminescent system according to claim 1 wherein polymer (i) is a copolyester having an isophthalate content of at least 30% by weight.

7. The luminescent system according to claim 6 wherein said polymer (i) is a polyester derived from isophthalic acid in combination with at least one dibasic carboxylic acid selected from the group consisting of terephthalic acid and sebacic acid.

8. The luminescent system according to claim 1 wherein said polymer (i) is a polyester derived from at least one diol selected from the group consisting of ethylene glycol, butane-1,4-diol, neopentyl glycol and 1,6-hexanediol.

9. The luminescent system according to claim 1 wherein said alkyloxylated bisphenol is within the scope of the following general formula:

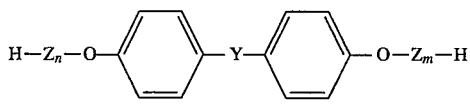

wherein:

Y represents an alkylidene group having from 1 to 4 C-atoms,

Z represents an oxyalkylene group wherein the alkylene group has 2 to 4 C-atoms, and m and n are integers 1 to 2.

10. The luminescent system according to claim 1 wherein said addition polymerizable monomer is a monomer with one olefinically unsaturated group and is selected from the group consisting of methyl (metha)acrylate, ethyl acrylate, butyl acrylate, 2-ethylhexyl methacrylate, 2-hydroxyethyl acrylate, 2-hydroxyethyl methacrylate, glycidyl methacrylate, n-hexyl acrylate, lauryl acrylate, and tetrahydrofurfuryl methacrylate, or is a monomer with two olefinically unsaturated groups and is selected from the group consisting of 1,6-hexanediol diacrylate, 1,6-hexanediol dimethacrylate, neopentylglycol diacrylate, 1,4-butanediol diacrylate, ethyleneglycol diacrylate, polyethyleneglycol diacrylate, pentaerythritol diacrylate, and divinylbenzene.

11. The luminescent system according to claim 1 wherein said primer layer is present also at the side of the support opposite to the side coated with said phosphorbinder layer.

12. The luminescent system according to claim 1 wherein said support is a polyethylene terephthalate support.

* * * * *

UNITED STATES PATENT AND TRADEMARK OFFICE
CERTIFICATE OF CORRECTION

PATENT NO. : 5,466,541
DATED : November 14, 1995
INVENTOR(S) : Jan E. Van Havenbergh et al It is certified that error appears in the above-indentified patent and that said Letters Patent is hereby corrected as shown below:

Title page;  subsection [*] which reads:

[*] Notice:  The portion of the term of this patent subsequent to Aug. 23, 2011 has been disclaimed.

should read:

[*] Notice:  The portion of the term of this patent subsequent to Feb. 27, 2012 has been disclaimed.

Column 2, line 49, "the prime layer" should read -- the primer layer --;

Column 2, line 51, "layer and driest" should read -- layer and dried --;

Column 4, line 64, "Aktiengesel lschaft," should read -- Aktiengesellschaft, --;

Column 5, line 38, "liquid toohomers" should read -- liquid monomers --;

Column 14, line 41, "(2) a reactive sol vent" should read -- (2) a reactive solvent --;

UNITED STATES PATENT AND TRADEMARK OFFICE
CERTIFICATE OF CORRECTION

PATENT NO. : 5,466,541
DATED : November 14, 1995
INVENTOR(S) : Jan E. Van Havenbergh et al It is certified that error appears in the above-indentified patent and that said Letters Patent is hereby corrected as shown below:

Column 15, line 7, "Silveriand" should read -- Silveri and --;

Column 17, line 28, "1-phenylopropan-1-one" should read -- 1-phenyl-propan-1-one --.

Signed and Sealed this

Twenty-fourth Day of September, 1996

Attest:

BRUCE LEHMAN

*Attesting Officer*   *Commissioner of Patents and Trademarks*